United States Patent
Serizawa et al.

(10) Patent No.: US 8,656,766 B2
(45) Date of Patent: Feb. 25, 2014

(54) SENSOR APPARATUS INTEGRATED TO INJECTOR OF INTERNAL COMBUSTION ENGINE

(75) Inventors: Kazufumi Serizawa, Kariya (JP); Jun Kondo, Nagoya (JP)

(73) Assignee: Denso Corporation, Kariya (JP)

( * ) Notice: Subject to any disclaimer, the term of this patent is extended or adjusted under 35 U.S.C. 154(b) by 42 days.

(21) Appl. No.: 13/435,060

(22) Filed: Mar. 30, 2012

(65) Prior Publication Data
US 2012/0247194 A1    Oct. 4, 2012

(30) Foreign Application Priority Data

Apr. 1, 2011    (JP) ................................ 2011-081943

(51) Int. Cl.
*G01M 15/00*    (2006.01)

(52) U.S. Cl.
USPC ...................................... 73/114.51

(58) Field of Classification Search
USPC .......................... 73/114.45–114.51
See application file for complete search history.

(56) References Cited

U.S. PATENT DOCUMENTS

| | | | | |
|---|---|---|---|---|
| 3,775,857 A | * | 12/1973 | Handy | 33/626 |
| 4,813,820 A | * | 3/1989 | Cadwell et al. | 408/1 R |
| 5,017,056 A | * | 5/1991 | Morash | 408/1 R |
| 5,133,323 A | * | 7/1992 | Treusch | 123/494 |
| 5,191,867 A | * | 3/1993 | Glassey | 123/446 |
| 5,195,362 A | * | 3/1993 | Eason | 73/49.7 |
| 7,044,106 B2 | * | 5/2006 | Kojima et al. | 123/337 |
| 7,963,155 B2 | * | 6/2011 | Kondo et al. | 73/114.43 |
| 8,375,924 B2 | * | 2/2013 | Kondo et al. | 123/494 |
| 8,474,438 B2 | * | 7/2013 | Kondo et al. | 123/494 |
| 2010/0251998 A1 | | 10/2010 | Kondo et al. | |
| 2010/0252002 A1 | | 10/2010 | Fujino et al. | |

FOREIGN PATENT DOCUMENTS

| | | |
|---|---|---|
| JP | 2010-242574 | 10/2010 |
| JP | 2010-242575 | 10/2010 |

* cited by examiner

*Primary Examiner* — Freddie Kirkland, III
(74) *Attorney, Agent, or Firm* — Nixon & Vanderhye PC

(57) ABSTRACT

A sensor apparatus that outputs an electrical signal responding to a physical quantity is provided. The sensor apparatus includes: a housing being screwed to a body and having an insertion hole; an electrical circuit section having an electrical component used for processing the electrical signal, being disposed at an one end side of the housing and integrated with the housing; and a plurality of pins inserted through the electrical circuit section, a first end of the pin being inserted into the insertion hole to be fixed therewith, a second end of the pin being protruded from the electrical circuit section to be capable of engaging with a jig. The jig is used to screw the housing to the body after the housing and the electrical circuit are integrated with each other.

8 Claims, 5 Drawing Sheets

SENSOR APPARATUS INTEGRATED TO INJECTOR OF INTERNAL COMBUSTION ENGINE

CROSS REFERENCE TO RELATED APPLICATION

This application is based on and claims the benefit of priority from earlier Japanese Patent Application No. 2011-81943, filed on Apr. 1, 2011, the description of which is incorporated herein by reference.

BACKGROUND

1. Technical Field

The present application relates to sensor apparatuses, and more particularly to a sensor apparatus integrated to an injector of an internal combustion engine in which an electrical signal is outputted responding to a physical quantity of the injector.

2. Description of the Related Art

As an example of a sensor apparatus, Japanese Patent Application Laid-Open Publication No. 2010-242574 discloses a sensor apparatus which is integrated to an injector for injecting fuel to an internal combustion engine. The sensor apparatus detects the pressure of the fuel injected to the internal combustion engine and is designed such that an electrical circuit section such as a molded integrated circuit (IC) of the sensor apparatus is integrated to a housing that is screwed to the injector-body by using a jig capable of engaging with the outer peripheral portion of the housing. In particular, the jig passes over the electrical circuit section from one end side of the axial-direction of the housing to engage with the outer peripheral portion of the housing.

However, according to conventionally-used sensor apparatus, the outer shape of the housing is necessary to be larger than that of the electrical circuit section to enable the jig to be engaged with the outer peripheral portion of the housing. As a result, because of the above-described reason, the sensor apparatus cannot be shrunk in size easily.

SUMMARY

An embodiment provides a sensor apparatus capable of shrinking size thereof.

As a first aspect of an embodiment, a sensor apparatus that outputs an electrical signal responding to a physical quantity is provided. The sensor apparatus includes: a housing screwed to a body and having an insertion hole; an electrical circuit section having an electrical component used for processing the electrical signal, being disposed at an one end side of the housing and integrated with the housing; and a plurality of pins inserted through the electrical circuit section, each of the pin having a first end and a second end, the first end of the pin being inserted into the insertion hole to be fixed therewith, the second end of the pin being protruded from the electrical circuit section to be capable of engaging with a jig. The jig is used to screw the housing to the body after the housing and the electrical circuit are integrated with each other.

According to the first aspect, the pin fixed to the housing and the jig are engaged so that the jig can be used to screw the housing to the body. Therefore, since it is not necessary to design the outer shape of the housing to become larger than the electrical circuit section, the sensor apparatus can be shrunk.

According to a second aspect of an embodiment, a sensor apparatus that outputs an electrical signal responding to a physical quantity is provided. The sensor apparatus includes a body; a housing being screwed to the body; an electrical circuit section having an electrical component used for processing the electrical signal, being disposed at an one end side of the housing and integrated with the housing; and a plurality of pin portion included in a jig. The electrical circuit section includes a through hole that enables the pin portion to be inserted therethrough. The housing includes an insertion hole capable of engaging to the tip of the pin portion. The jig is used to screw the housing to the body after the housing and the electrical circuit are integrated with each other.

According to the second aspect, the pin portion of the jig is engaged to the pin-insertion hole of the housing and the housing is screwed to the body by the jig. Hence, since it is not necessary to design the outer shape of the housing to become larger than the electrical circuit section, the sensor apparatus can be shrunk.

DETAILED DESCRIPTION OF THE PREFERRED EMBODIMENTS

With reference to the drawings, hereinafter will be described embodiments according to the present application. It is noted that portions which are mutually identical or similar in the embodiments are labeled with the same reference numbers.

First Embodiment

Figure 1:
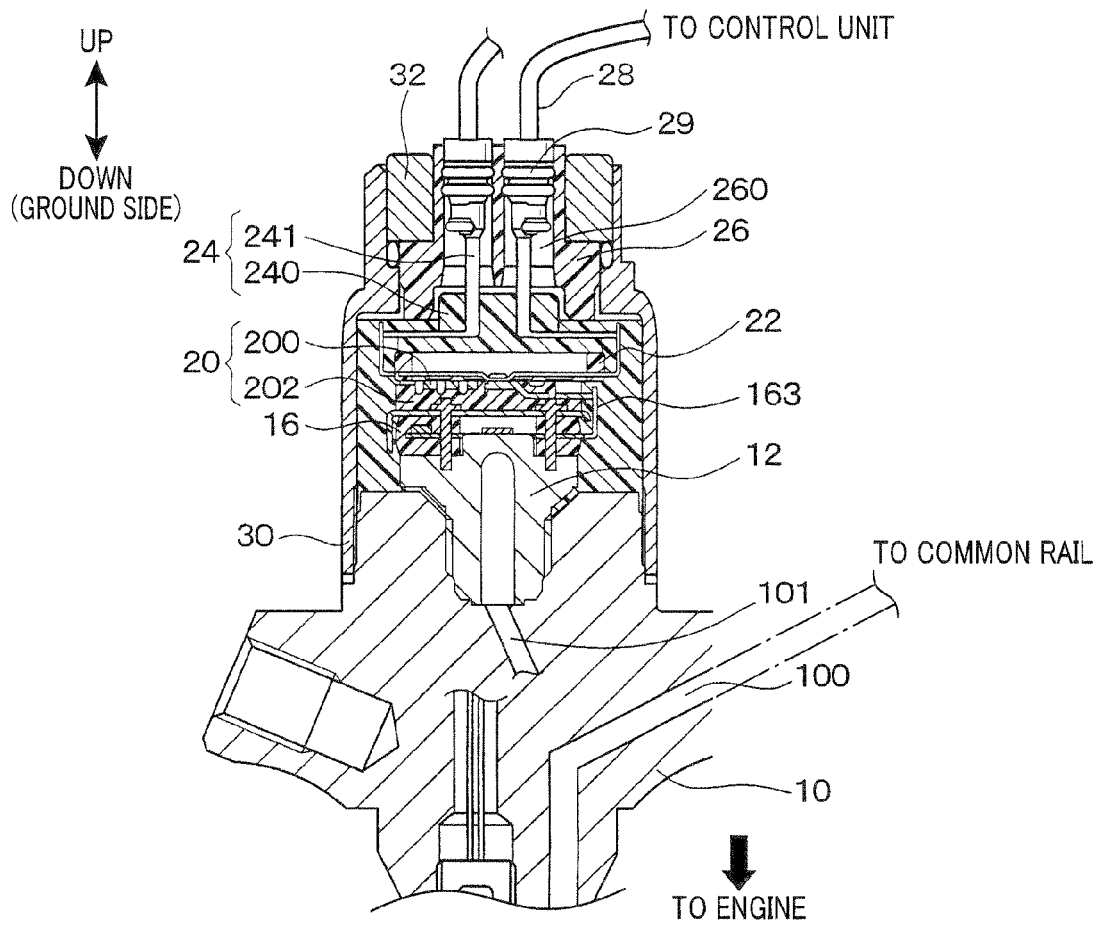
FIG. 1 is a front-cross-sectional view showing a major portion of an injector including a sensor apparatus according to the first embodiment of the present application.
Figure 2:
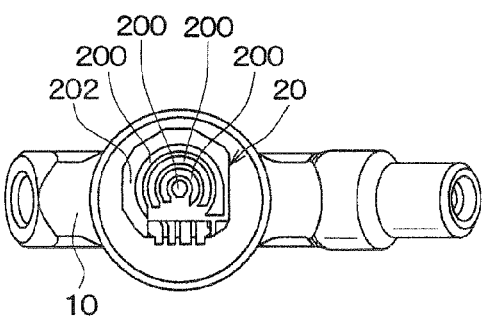
FIG. 2 is a plan view showing the injector before a first terminal member is assembled.
Figure 3:
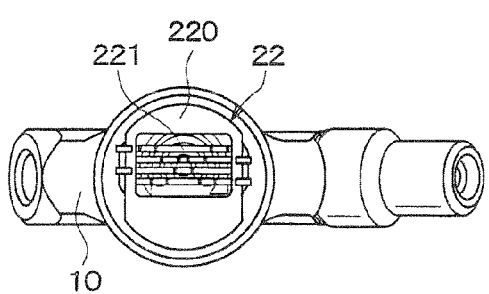
FIG. 3 is a plan view showing the injector after the first terminal member is assembled.
Figure 6:
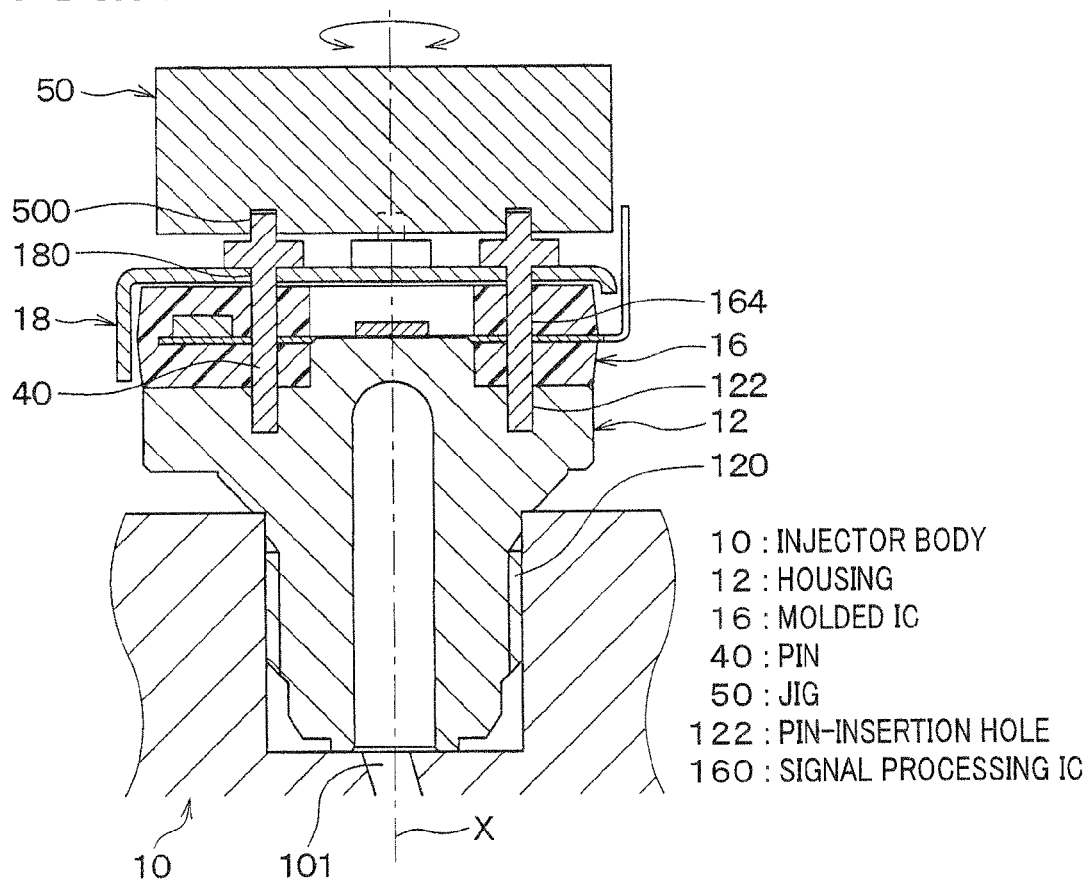
FIG. 6 is a front-cross-sectional view showing the major portion of the sensor apparatus of FIG. 1 and a jig used for assembling.

With reference to FIGS. 1 to 6, it is described the first embodiment according to the present application. FIG. 1 is a front-cross-sectional view showing a major portion of an injector including a sensor apparatus, FIG. 2 is a plan view showing the injector before a first terminal member is assembled, FIG. 3 is a plan view showing the injector after the first terminal member is assembled, FIG. 4A is a front-cross-sectional view showing a major portion of the sensor apparatus in the injector illustrated in FIG. 1, FIG. 4B is a plan view showing the major portion of the sensor apparatus according to FIG. 4A, FIG. 5A is a plan view showing the terminal member itself of the terminal member illustrated in FIG. 1, FIG. 5B is a cross sectional view taken from a line A-A of FIG. 5A, and FIG. 6 is a front-cross-sectional view showing the major portion of the sensor apparatus of FIG. 1 and a jig used for assembling.

As shown in FIGS. 1 and 4, the injector is used to inject high pressure fuel supplied by a common-rail injection system (not shown) into the cylinders of the diesel engine. In an injector body 10 (i.e., a body) made of metal as an attached body where the injector is attached, a high pressure passage 100 through which the high pressure fuel flows and a bypass passage 101 which is bypassed from the high pressure passage 100 are formed.

A metal housing 12 having flanged cylindrical shape is screwed to the upper end of the injector body 10. The housing 12 includes a male screw portion 120, a thin wall portion 121 and three pin-insertion holes 122. The male screw portion 120 is used to screw the housing 12 into the injector body 10. The thin wall portion 121 is capable of being transformed in response to a pressure of the fuel being led via the bypass passage 101. A pin 40 (described later) is inserted into the pin-insertion hole 122 (i.e., insertion hole).

The thin wall portion 121 includes a sensor section 14 being attached thereto. The resistor value of the sensor section 14 varies depending on a rate of the transformation of the thin wall portion 121 (i.e., in response to the fuel-pressure of the fuel at the high pressure passage 100).

At one end side of the axial-direction X of the housing 12, a molded IC (integrated circuit) 16 as an electrical circuit section is disposed to surround the thin wall portion 121 and the sensor section 14. The molded IC 16 includes a signal processing IC 160 as an electrical component and a lead frame 161 which is connected to the signal processing IC 160. The signal processing IC 160 outputs an electrical signal responding to the fuel-pressure, based on a variation of the resistor value of the sensor section 14.

The signal processing IC 160 and the lead frame 161 are encapsulated by a mold-resin layer 162 having an excellent electrical-insulation property. A sensor terminal 163 included in the lead frame 161 protrudes from a side surface of the outer periphery of the mold-resin layer 162. Three IC through holes 164 (i.e., through hole) where the pin 40 is inserted therethrough are formed on the lead frame 161 and the mold-resin layer 162.

A shield cover 18 made of metal plate in order to shield electrical noise is disposed at an anti-housing side (upward direction in FIG. 1 and FIG. 4A) of the mold IC 16. The shield cover 18 includes three cover through holes 180 to which the pins 40 are inserted.

The pin 40 is formed by a metal to have a cylindrical shape. The pin 40 includes a flange section 400 formed at a middle portion in the axial direction thereof. The pin 40 is inserted into the cover through hole 180 and the IC through hole 164 and one end (i.e., first end) of the pin 40 is fixed into a hole 122 by press-fitting. As a result, the molded IC 16 and the shield cover 18 are sandwiched between the flange section 400 of the pin 40 and the housing 12 so that the housing 12, the molded IC 17 and the shield cover 18 are integrated. The other end (i.e., second end) of the pin 40 and the flange section 400 are protruded from the molded IC 16 and the shield cover 18.

A relay-terminal member 20 having a plurality of relay-terminal 200 is disposed at an anti-housing side of the shield cover 18. The shield cover 18 and the relay-terminal member 20 are joined by an adhesive.

A first terminal member 22 having a plurality of first terminals is disposed at an anti-housing side of the relay-terminal member 20. A second terminal member 24 having a plurality of second terminals is disposed at an anti-housing side of the first terminal member 22. Further, an insulation member 26 having approximately cylindrical shape is disposed at an anti-housing side of the second terminal member 24. The insulation member 26 is made of resin having an excellent electrical-insulation property. A plurality of lead wire 28 is penetrated through a through hole 260 of the insulating member 26. A waterproof member 29 seals a portion between the through hole 260 and the lead wire 28. The waterproof member 29 is formed by a rubber to have cylindrical shape.

A cover 30 having cylindrical shape is screwed to one end of the injector body 10 and a disk-shape cap 32 is fixed to the opening end of the cover 30 by press-fitting. In a space surrounding by the injector body 10, the cover 30 and the cap 32, the housing 12 and the molded IC 16 and the like are accommodated.

Figure 4B:
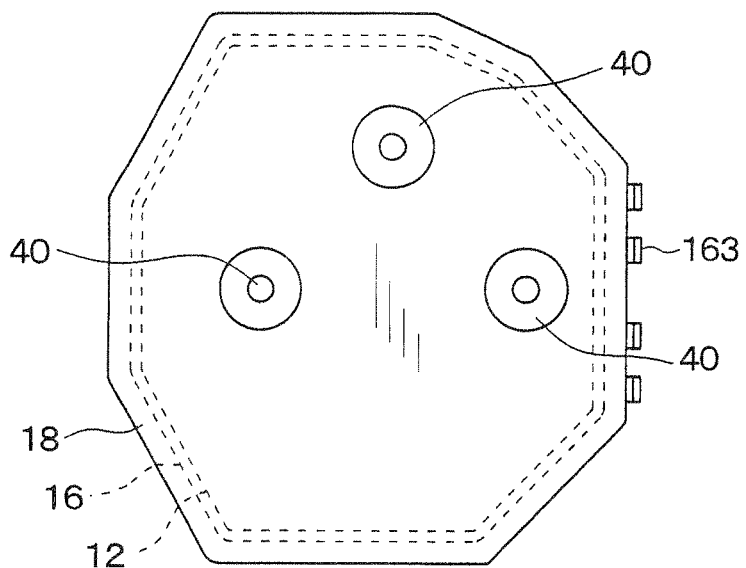
FIG. 4B is a plan view showing the major portion of the sensor apparatus according to FIG. 4A.
Figure 4A:
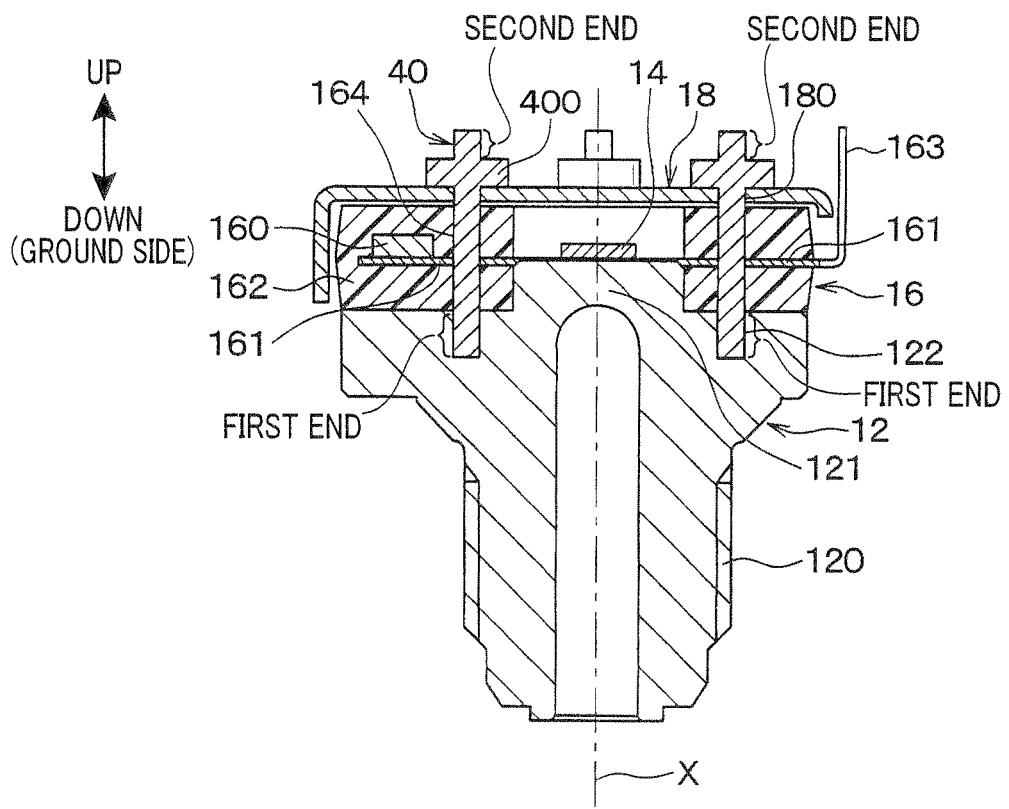
FIG. 4A is a front-cross-sectional view showing a major portion of the sensor apparatus in the injector illustrated in FIG. 1.
Figure 5A:
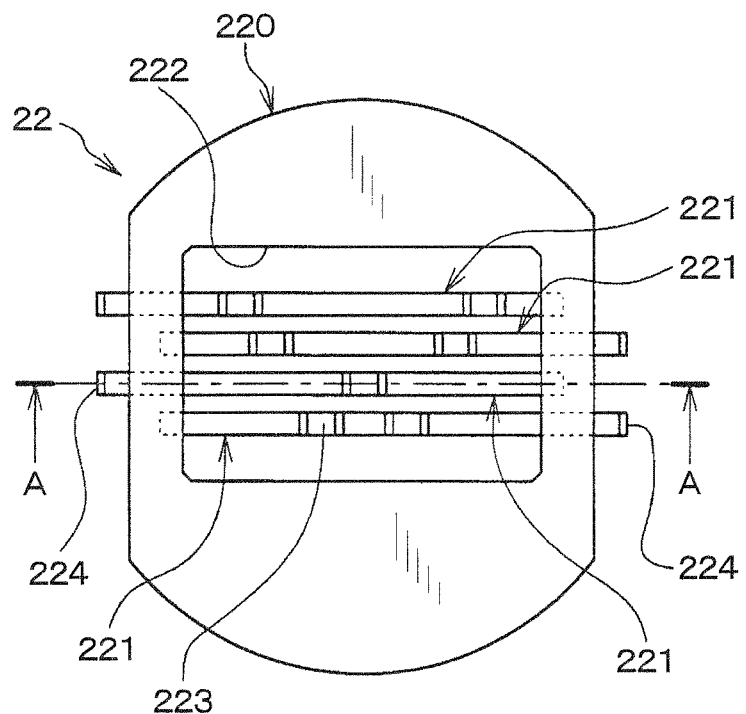
FIG. 5A is a plan view showing the terminal member itself of the terminal member illustrated in FIG. 1.
Figure 5B:
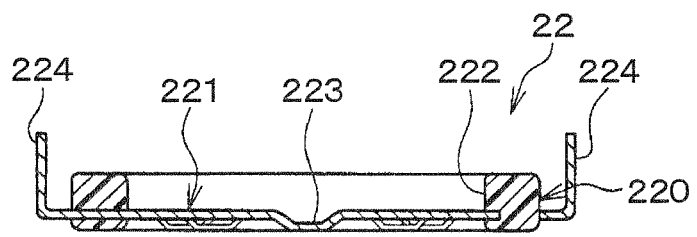
FIG. 5B is a cross sectional view taken from a line A-A of FIG. 5A.

As shown in FIG. 4B, outer shapes of the housing 12, the molded IC 16 and the shield cover 18 when viewing towards the axial-direction X of the housing 12 are similar figures. The outer shape of the housing 12 is smaller than that of the molded IC 16 and the shield cover 18 when viewing towards the axial-direction X of the housing 12.

As shown in FIG. 1 and FIG. 2, the relay-terminal member 20 includes a mold-resin layer 202 made of mold-resin in which four relay-terminals 200 made of conductive metal are integrated by molding to have disk shape. One end section of the four relay-terminals 200 is protruded from the outer periphery side of the mold-resin layer 202, and the one end section is welded to the sensor terminal 163 of the molded IC 16.

Three relay-terminals 200 among the four relay-terminals 200 include a portion having an arc shape (i.e., arc-shape portion) disposed concentrically about the axial-direction X. The middle portion is exposed to one end side of the mold-resin layer 202. One relay-terminal 200 among the four relay-terminals 200 includes a portion having approximately rectangular shape (i.e., rectangular-shape portion) that is exposed to the one end side of the mold-resin layer 202.

As shown in FIG. 3 and FIG. 5, the first terminal member 22 includes a mold-resin layer 220 made of resin in which four first terminals 221 made of conductive metal are integrated by molding. The mold-resin layer 220 has a disk shape and an opening portion 222 having a rectangular shape formed at central portion of the mold-resin layer 220.

The four first terminals 221 are press-formed from a plate having thin-thickness and narrow-width to have rectangular (strip) shape. The four first terminals 221 are disposed in parallel each other. In the first terminal 221, a portion locating at a middle portion in a longitudinal direction thereof is in the opening portion 222. Further, in the middle portion of the first terminal 221, a convex portion 223 protruded to the arc-shape portion and the rectangular portion of the relay-terminal 200 is formed. The convex portion 223 is welded with the arc-shape portion and the rectangular-shape portion of the relay-terminal 200.

The first terminal 221 has two end portions in the longitudinal direction thereof in which either one end portion is protruded from the mold-resin layer 220. The end portion 224 protruded towards longitudinal direction is hereinafter referred to a protrusion 224.

As shown in FIG. 1, the second terminal member 24 includes a mold-resin layer 240 made of resin in which four second terminals 241 made of conductive metal are integrated by molding.

The second terminal 241 has L-shape and both ends are protruded from the mold-resin layer 240. One end side of the second terminal 241 is welded with the protrusion 224 of the first terminal 221 and the other end side of the second terminal 241 is electrically connected to the lead wire 28.

The signal processing IC 160 is electrically connected to a plurality of lead wires 28 via the sensor terminal 163, the relay-terminal member 20, the first terminal member 22 and the second terminal member 24. These lead wires 28 are used for connection of a power supply to the signal processing IC 160, ground connection, signal wire through which sensor signal is transmitted to an engine-ECU from the sensor section.

Next, an assembling procedure for attaching the housing 12 and the molded IC 16 to the injector body 10 is described as follows.

First, a sensor sub-assembly is prepared. Specifically, the sensor section 14 is attached to the thin wall portion 121 of the housing 12. Next, after applying adhesive to a surface of the molded IC 16 (surface facing to the housing 12), positions of the pin-insertion hole 122 and the IC through hole 164 are adjusted to be located at the same axis whereby the housing 12 and the molded IC 16 are integrated.

Subsequently, the sensor section 14 and the signal processing IC 160 of the molded IC 16 are electrically connected by bonding wires. Then, after an adhesive is applied to a surface of the shield cover 18 (a surface facing to the molded IC 16), positions of the IC through hole 164 and the cover through hole 180 are adjusted to be located at the same axis whereby the shield cover 18 is integrated with the housing 12 and the molded IC 16.

The pin 40 is inserted into the cover through hole 180 and the IC through hole 164, and one end of pin 40 is fixed into the pin-insertion hole 122 by press-fitting. As a result, assembling the sensor sub-assembly is completed.

Further, a lead wire sub-assembly is prepared. Specifically, the second terminal member 24 and the lead wire 28 are integrated and the cap 32 and the insulating member 26 are integrated. Then, the lead wire 28 is put through the cover 30 and the through hole 260 of the insulating member 26 whereby the lead wire sub-assembly is assembled.

As shown in FIG. 6, the sensor sub-assembly is attached to the injector body 10 by using a jig 50. The jig 50 includes three pin-engaging holes 500. Each of the pin-engaging holes 500 is capable of engaging with the other end of the pin 40 which is protruded from the shield cover 18. The other end of the pin 40 is inserted into the pin-engaging hole 500 so as to engage each other. Then, having the jig 50 rotate about the axial-direction X, the male screw portion 120 is screwed with the injector body 10 thereby attaching the sensor sub-assembly to the injector body 10.

Next, the jig 50 is detached. As shown in FIG. 1, an adhesive is applied to a surface which is anti-molded IC 16 side of the shield cover 18 so as to bond the relay-terminal member 20 on the shield cover 18. Then, the relay-terminal 200 of the relay-terminal member 20 and the sensor terminal 163 are welded.

The first terminal member 22 is placed on the relay-terminal member 20 and the relay-terminal 200 and the convex portion of the first terminal 221 are welded. Moreover, the second terminal member 24 of the lead wire sub-assembly is placed on the first terminal member 221 and the first terminal 221 and the second terminal 241 are welded.

Next, the sensor sub-assembly, the relay-terminal member 20, the first terminal member 22 and the lead wire sub-assembly are molded by a resin as a secondary molding while they are attached to the injector body 10. Subsequently, the cover 30 is screwed to the injector body 10 so as to attach the cover 30 to the injector body 10.

The cover 30 is fixed to the insulating member 26 by press-fitting and the cap 32 and the insulating member 26 are attached to the cover 30. Further, the waterproof member 29 is inserted to the through hole 260 of the insulating member 26. As a result, attaching the housing 12 and the molded IC 16 to the injector body 10 is completed.

According to the first embodiment, the pin 40 fixed to the housing 12 and the jig 50 are engaged whereby the housing 12 and the injector body 10 are screwed to the injector body 10 by the jig 50. Therefore, unlike the sensor apparatus used conventionally, the outer shape of the housing 12 is not necessary be larger than that of the molded IC 16 and the shield cover 18. Accordingly, since the outer shape of the housing 12 can be smaller than that of the molded IC 16 and the shield cover 18, the sensor apparatus can be shrunk.

Moreover, since the pin 40 can be used for adjusting positions of the molded IC 16 and the shield cover 18, positions of the molded IC 16 and the shield cover 18 against the housing 12 can be adjusted more accurately.

Second Embodiment

Figure 7:
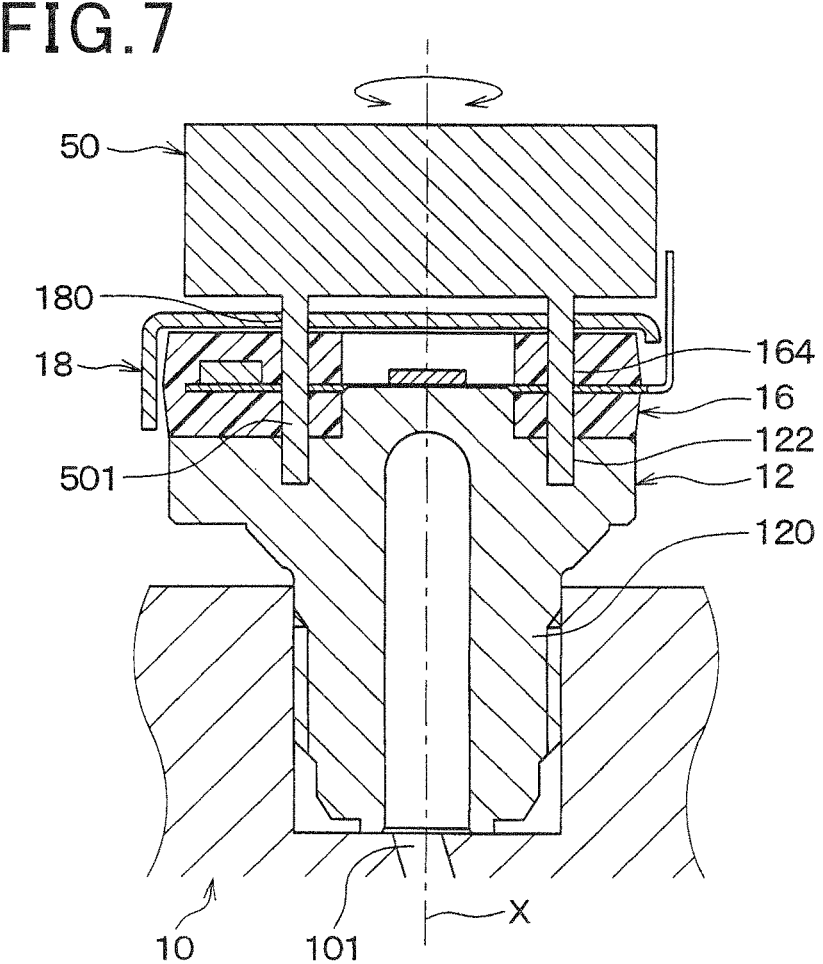
FIG. 7 is a front-cross-sectional view showing the major portion of the sensor apparatus according to the second embodiment of the present application and a jig used for assembling.

Hereinafter will be described a second embodiment of the present application. FIG. 7 is a front-cross-sectional view showing the major portion of the sensor apparatus according to the second embodiment of the present application and a jig used for assembling. In the second embodiment, only portions differing from the first embodiment is described as follows.

As shown in FIG. 7, three pin portions 501 having cylindrical shapes are formed in the jig 50 so that the pin 40 according to the first embodiment has been removed.

Next, a process of attaching the housing 12 and the molded IC 16 to the injector body 10 is described.

First, the sensor section 14 is attached to the thin wall portion 121 of the housing 12. Subsequently, after applying adhesive to a surface of the molded IC 16 (surface facing to the housing 12), positions of the pin-insertion hole 122 and the IC through hole 164 are adjusted to be located at the same axis whereby the housing 12 and the molded IC 16 are integrated.

Then, the sensor section 14 and the signal processing IC 160 of the molded IC 16 are electrically connected by bonding wires. Then, after an adhesive is applied to a surface of the shield cover 18 (a surface facing to the molded IC 16), positions of the IC through hole 164 and the cover through hole 180 are adjusted to be located at the same axis whereby the shield cover 18 are integrated with the housing 12 and the molded IC 16.

Subsequently, the pin portion 501 of the jig 50 is inserted to the cover through hole 180 and the IC through hole 164. It is noted that the IC through hole 164 is designed to enable the pin portion 501 to be inserted therethrough. After the tip of the pin portion 501 is engaging to the pin-insertion hole 122, having the jig 50 rotate about the axial-direction X, the male screw portion 120 of the housing 12 is screwed to the injector body 10. Then, the jig 50 is detached from the cover through hole 180 and an assembling procedure similar to the first embodiment is performed.

According to the embodiment, the pin portion 501 of the jig 50 is engaged with the pin-engaging hole 500 of the housing 12 whereby the housing 12 is screwed to the injector body 10 by the jig 50. As a result, since outer shape of the housing 12 can be smaller than that of the molded IC 16 and the shield cover 18, the sensor apparatus can be shrunk as well.

Other Embodiment

According to the above-described embodiments, the present application is applied to injectors, however, the present application can be adapted to other apparatuses other than injectors.

Further, according to the above-described embodiments, a sensor apparatus that detects a pressure is described. However, the present application can be adapted to a sensor apparatus that detects physical quantities other than the pressure.

What is claimed is:

1. A sensor apparatus that outputs an electrical signal responding to a physical quantity, comprising:
    a housing screwed to a body and having an insertion hole, the housing being screwed to the body by a jig;
    an electrical circuit section having an electrical component used for processing the electrical signal, disposed at an one end side of the housing and integrated with the housing; and
    a plurality of pins inserted through the electrical circuit section, each of the pin having a first end and a second end, the first end of the pin being inserted into the insertion hole to be fixed therewith, the second end of the pin being protruded from the electrical circuit section,
    wherein the jig is engaged with the second end of the pin so as to screw the housing to the body.

2. The sensor apparatus according to claim 1, wherein the electrical circuit section is configured by a molded integrated circuit in which the electrical component is encapsulated by a resin.

3. The sensor apparatus according to claim 2, wherein the body is a body of an injector for injecting fuel to an internal combustion engine, and the physical quantity is a pressure of the fuel flowing inside the body.

4. The sensor apparatus according to claim 1, wherein the body is a body of an injector for injecting fuel to an internal combustion engine, and the physical quantity is a pressure of the fuel flowing inside the body.

5. A sensor apparatus that outputs an electrical signal responding to a physical quantity, comprising:
    a housing being screwed to a body;
    an electrical circuit section having an electrical component used for processing the electrical signal, being disposed at an one end side of the housing and integrated with the housing; and
    a plurality of pin portions included in a jig,
    wherein the electrical circuit section includes a through hole that enables the pin portion to be inserted therethrough, the housing includes an insertion hole capable of engaging to the tip of the pin portion so as to allow the jig to screw the housing to the body.

6. The sensor apparatus according to claim 5, wherein the electrical circuit section is configured by a molded integrated circuit in which the electrical component is encapsulated by a resin.

7. The sensor apparatus according to claim 5, wherein the body is a body of an injector for injecting fuel to an internal combustion engine, and the physical quantity is a pressure of the fuel flowing inside the body.

8. A method for assembling an injector provided with a sensor apparatus that outputs an electrical signal responding to a physical quantity of the injector, comprising the steps of:
    preparing a housing having an insertion hole and an axial-direction X, an electrical circuit section having an electrical component used for processing the electrical signal, and a plurality of pins each having a first end and a second end;
    inserting the pins through the electrical circuit section to fix the first end with the insertion hole and to have the second hole protruded from the electrical circuit section;
    preparing a jig capable of engaging with the second end of the pin and a body of the injector;
    engaging the jig with the second end of the pin; and
    rotating the jig about the axial-direction X of the housing to screw the housing to the body.

* * * * *